INVENTOR.
HARRY W. MOORE

United States Patent Office 2,891,642
Patented June 23, 1959

2,891,642

CLUTCH AND BRAKE MECHANISM

Harry W. Moore, Dayton, Ohio

Application September 23, 1954, Serial No. 457,986

5 Claims. (Cl. 192—18)

This invention relates to a clutch and brake mechanism. It relates particularly to a clutch and brake mechanism for a rotatably mounted shaft member. It relates still more particularly to a clutch and brake assembly in which, by movement of a simple engagement member, a shaft member may be made freely rotatable, or locked from rotation, or clutched for rotation with a drive wheel. However, the invention is not so limited in that the structure thereof may also be applicable in mechanisms which do not have a rotatable member.

An object of this invention is to provide a brake and clutch mechanism for a rotatably mounted shaft, the brake and clutch mechanism being entirely supported by the rotatably mounted shaft.

Another object of the invention is to provide a brake and clutch assembly in which there is no axial movement of support bearings during the clutching or braking operation.

Another object of this invention is to provide a brake and clutch assembly in which either the braking action or clutching action can be resiliently operated.

Other objects and advantages reside in the construction of parts, the combination thereof and the mode of operation, as will become more apparent from the following description.

Figure 1:
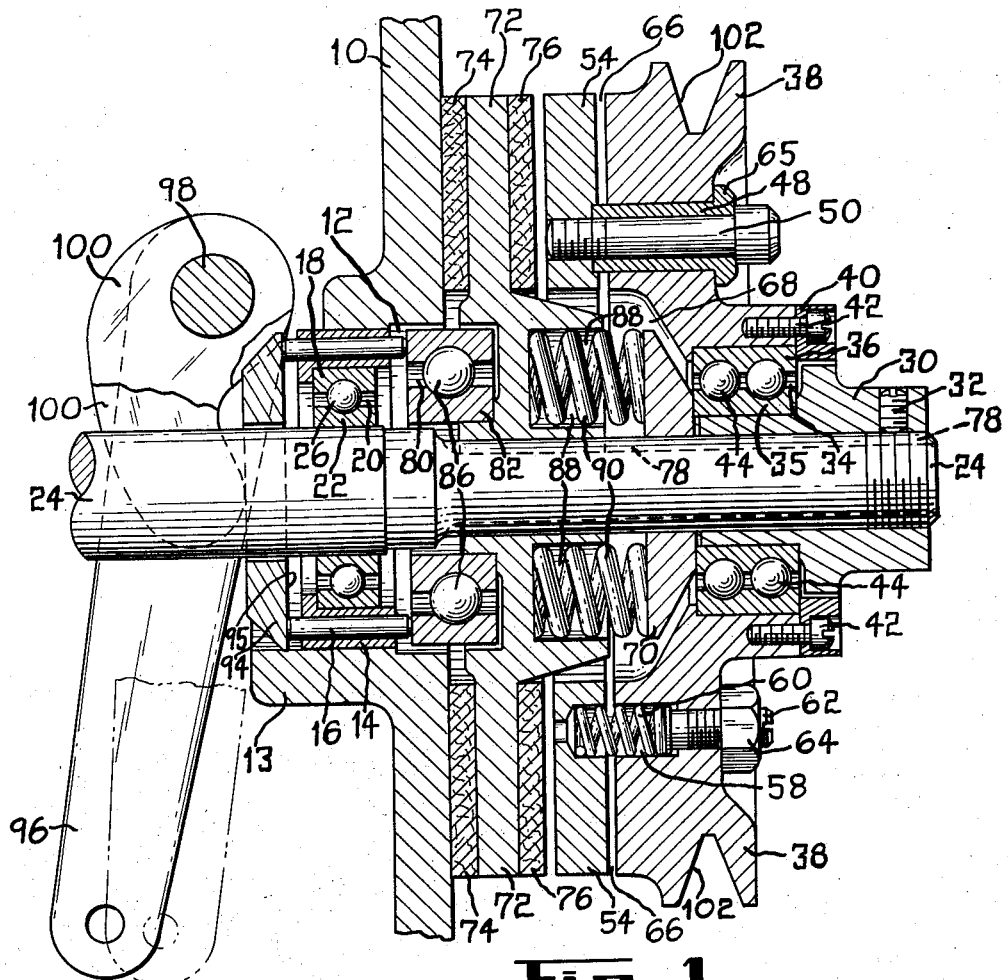

In the drawings, Figure 1 is a sectional view disclosing the brake and clutch mechanism of this invention showing the elements thereof in the braking or locking position.

Figure 2:
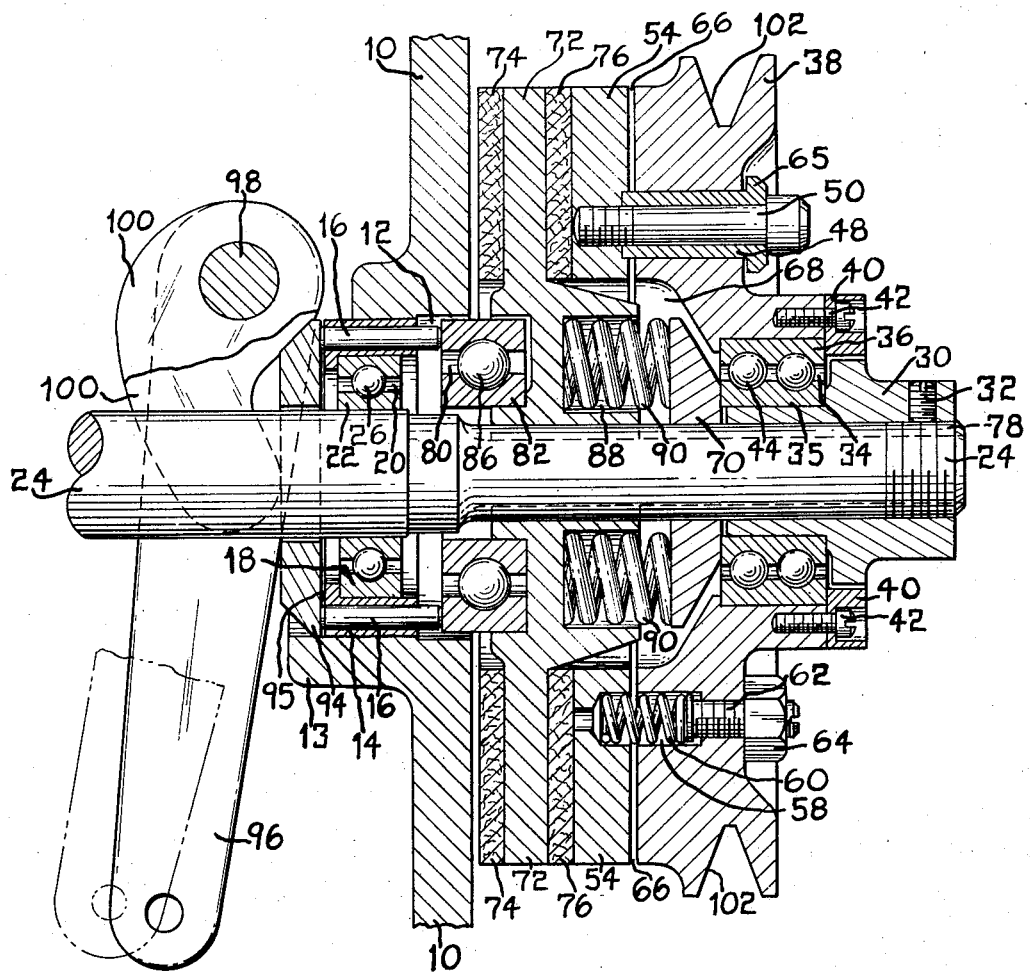

Figure 2 is a sectional view similar to that of Figure 1, showing the invention in the clutching position.

Referring to the drawings in detail, a brake and clutch mechanism of this invention comprises any suitable support structure such as support structure 10. The support structure 10 is provided with a cylindrical bore 12 and an arcuate projection 13 within which is securely mounted an annular ring member 14. The support structure 10 also serves as a stationary brake surface plate as will be described below.

The ring member 14 slidably carries a plurality of pin members 16. The pin members 16 are disposed parallel to the outer periphery of the ring member 14, and are axially movable therein. The purpose of the slidably mounted pin members 16 will be discussed below.

Firmly retained within the ring 14 and concentric therewith is an outer race 18 of an anti-friction bearing 20. The anti-friction bearing 20 is also provided with an inner race 22 which is firmly attached to a shaft member 24.

A plurality of balls or rollers 26 are disposed between the outer race 18 and the inner race 22. The shaft member 24 is thus rotatably supported within the support structure 10 by means of the anti-friction bearing 20.

Adjacent the end of the shaft 24 is firmly attached a sleeve member 30. A set screw 32 aids in securing the sleeve 30 to the shaft 24. An anti-friction bearing 34 having an inner race 35 and an outer race 36 is supported upon the sleeve 30 and rotatably carries a drive wheel or belt pulley 38.

An attachment ring 40, concentric with the bearing 34, and a plurality of screws 42 threaded into the drive wheel 38 aid in securing the drive wheel 38 to the outer race 36 of the anti-friction bearing 34. The anti-friction bearing 34 is provided with a plurality of rollers or balls 44 between the inner race and the outer race thereof.

The drive wheel 38 may be provided with a clutch surface integral therewith which faces the support structure 10. However, preferably, means are provided for resilient mounting of a clutch plate 54 for support by the drive wheel 38.

The drive wheel 38 is provided with a plurality of bushing members 48 slidably extending through the drive wheel 38. The bushing members 48 are parallel to the axis of the drive wheel 38 and are equidistantly spaced intermediate the periphery of the drive wheel 38 and the axis thereof. A bolt 50 extends through each bushing 48 and is threadedly attached to the clutch plate 54. The bushing 48 is of sufficient length to extend through the drive wheel 38 and to abut the clutch plate 54.

The clutch plate 54 and the drive wheel 38 are provided with a plurality of aligned recesses 58 within each of which is disposed a helical spring 60 which abuts the end of an adjustable set screw 62 provided with a lock nut 64. Each of the spring members 60 urges the clutch plate 54 from the drive wheel 38 to the maximum extent permitted by the bolt 50, the head of which abuts a flanged end 65 of the bushing 48. Thus, a space 66 exists between the drive wheel 38 and the clutch plate 54.

The drive wheel 38 is provided with a central recess 68 within which is located an abutment collar 70 which is firmly attached to the shaft 24 and abuts the inner race 35 of the anti-friction bearing 34.

Intermediate the clutch plate 54 and the support structure 10 is an engagement wheel 72 which is provided with a brake portion 74 and a clutch portion 76. The engagement wheel 72 is splined at the central portion and is slidably attached to the shaft 24 by means of a plurality of complementary longitudinal grooves 78 adjacent the surface of the shaft 24.

An anti-friction bearing 80 is provided with an inner race 82 which is firmly attached to the engagement wheel 72 within a recessed portion thereof. The outer race of the anti-friction bearing 80 is freely rotatable upon a plurality of balls or rollers 86.

Partially disposed within recessed portions 88 of the engagement wheel 72, parallel to the axis thereof and opposite the anti-friction bearing 80 are a plurality of helical spring members 90. Each of the helical springs 90 has one end thereof abutting the engagement wheel 72 within one of the recessed portions 88, and the other end thereof abutting the abutment collar 70. It is to be understood that within the purview of this invention a single helical spring encircling the shaft 24 may be substituted for the plurality of springs 90.

An actuator collar 94 rests upon the arcuate projection 13 of the support structure 10 concentric with the bore 12, and freely encircles the shaft 24. The actuator collar 94 has a surface 95 which engages one end of the pin members 16. The other end of the pin members 16 abuts the outer race of the anti-friction bearing 80. The actuator collar 94 is axially movable with respect to the shaft 24. Any suitable means may be employed to move the actuator collar 94. However, herein the means for movement of the actuator collar 94 is shown as being a lever member 96 which is firmly attached to a pivotal rod 98. Also firmly attached to the pivotal rod 98 are a pair of fingers 100.

In the mechanism of this invention the pulley wheel or drive wheel 38 is adapted to be driven continuously by any suitable member, such as by a V-belt (not shown), disposed within a V-shaped annular groove 102 of the drive wheel 38. As the drive wheel 38 is rotatively driven, the shaft 24 may be locked from rotation by means of the engagement wheel 72, the brake portion 74 thereof being firmly held in engagement with the support structure 10, the engagement wheel 72 being firmly urged toward the support structure 10 by means of the helical springs 90.

When it is desired to clutch the shaft 24 for rotation with the drive wheel 38, all that is necessary is that the lever member 96 be pivotally operated in a counter-clockwise direction as shown in Figure 2. This pivotal movement of the lever member 96 causes pivotal movement of the fingers 100 which causes pressure to be applied to the actuator collar 94. The actuator collar 94 is thus axially moved toward the anti-friction bearing 20. As the actuator collar 94, supported by the arcuate projection 13, moves toward the anti-friction bearing 20, the actuator collar 94 which engages the pin members 16 causes axial movement of the pin members 16 as the pin members 16 slidably move within the ring 14. Due to the fact that the other end of each of the pin members 16 engages the outer race of the anti-friction bearing 80, the engagement wheel 72 is forced to move toward the clutch plate 54. Of course, this movement of the engagement wheel 72 toward the clutch plate 54 is against the resilient pressure of the helical springs 90.

As the engagement wheel 72 is moved toward the clutch plate 54, the brake portion 74 thereof is disengaged from the surface of the support structure 10, and further movement results in engagement of the clutch portion 76 of the engagement wheel 72 with the clutch plate 54 as shown in Figure 2.

Movement of the lever member 96 is so governed or controlled that the engagement wheel 72 continues axial movement a slight distance toward the drive wheel 38 after the clutch portion 76 of the engagement wheel 72 has engaged the clutch plate 54. Each bushing 48 slidably moves within the wheel 38. Thus, the space 66 between the clutch plate 54 and the drive wheel 38 is decreased slightly as the clutch plate 54 is moved toward the drive wheel 38. This movement of the clutch plate 54 toward the drive wheel 38 forces further compression of each of the springs 60, which are disposed between the clutch plate 54 and the drive wheel 38. Hence there is firm resilient engagement of the clutch portion 76 of the engagement wheel 72 with the clutch plate 54 as shown in Figure 2.

While the lever member 96 is maintained in the actuated position, as shown in Figure 2, the engagement wheel is clutched with the clutch plate 54 for rotation therewith.

Engagement of the clutch portion 76 of the engagement wheel 72 with the clutch plate 54 causes rotation of the engagement wheel 72 with the drive wheel 38 and the shaft 24 is thus caused to rotate with the drive wheel 38.

Movement of the actuator collar 94 toward the anti-friction bearing 18 causes sliding movement of the pins 16 within the ring 14. There is no sliding movement of any of the anti-friction bearings of the assembly in the clutching or braking operation. The bearing 80 carried by the engagement wheel 72 moves axially but the bearing 80 does not slide due to the fact that it does not engage the shaft 24 or the support structure 10, as shown in Figures 1 and 2.

The engagement wheel 72 may be moved against the force of the springs 90 to a position between the support structure 10 and the clutch plate 54, wherein the engagement wheel does not contact either the support structure 10 or the clutch plate 54. In such position, the shaft 24 is freely rotatable with respect to both the support structure and the drive wheel 38.

It is to be understood that the support structure as engaged by the brake portion 74 of the engagement wheel 72 acts as a brake plate.

When it is desired to stop the shaft 24 from rotation with the drive wheel 38, all that is necessary is to release pressure applied at the end of the lever member 96, permitting the lever member 96 to be pivotally moved in a clockwise direction as the engagement wheel 72 is urged toward the support structure 10 by the helical spring members 90. Thus, the spring members 90 resiliently cause braking action of the shaft 24 as the brake portion 74 of the engagement wheel 72 engages the brake plate or support structure 10, as shown in Figure 1. Thus, it may be understood that the braking and clutching operation of the mechanism of this invention is performed easily and readily with the minimum amount of movement of any of the elements within the mechanism. There is a negligible amount of frictional movement of any of the elements of the assembly.

Rather than have the braking action resiliently operated as shown by the drawings, the clutching operation may be resiliently actuated. Furthermore, both the clutching and braking operation of a mechanism of this invention may be by mechanical, fluid or electrical means, or by any other suitable means of operation.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a clutch and brake mechanism comprising a support structure provided with a cylindrical bore therein, a bearing firmly positioned within said bore, a shaft rotatably supported within said bearing, a drive wheel rotatably supported upon said shaft in spaced relation from said support structure, a clutch plate supported by the drive wheel concentric therewith, the clutch plate being resiliently retained in spaced relation from the drive wheel, an engagement wheel slidably attached to the shaft intermediate the clutch plate and the support structure, resilient means urging the engagement wheel to abuttingly engage the support structure, pin means carried by said support structure parallel to said shaft and having axial movement with respect to said shaft, means for axial movement of the pin means, said pin means being engageable with said engagement wheel, said means for axial movement of the pin means being sufficient to move said engagement wheel from engagement with said support structure against the force of the resilient means so that the engagement wheel engages said clutch plate, engagement of said engagement wheel with said support structure thus preventing rotation of said shaft, and engagement of said engagement wheel with said clutch plate thus connecting the shaft to said drive wheel for rotation therewith.

2. A brake and clutch mechanism including a support structure, the support structure being provided with an annular bore therein, a ring firmly secured to the support structure within the bore, an anti-friction support bearing concentric with said ring and having an outer race firmly secured to said ring, the anti-friction support bearing also being provided with an inner race, a shaft secured to the inner race, the shaft thus being rotatably carried by said anti-friction support bearing within said support structure, a drive wheel rotatably mounted upon the shaft in spaced relation from the support structure, a clutch plate attached to the drive wheel concentric with the shaft and disposed intermediate the drive wheel and the support structure, an abutment collar attached to the shaft adjacent the clutch plate, an engagement wheel slidably keyed to the shaft intermediate the clutch plate and the support structure, a plurality of spring members compressed between the abutment collar and the engagement wheel, said spring members urging the engagement wheel to engage the support structure, a second anti-friction bearing, the second anti-friction bearing being disposed between the engagement wheel and the ring, the second anti-friction bearing having an inner race attached to the engagement wheel, the second anti-friction bearing having an outer race freely rotatable, said ring having a plurality of pins slidably mounted therein and equidistantly spaced from the shaft and parallel thereto, the pins thus being only axially movable, an actuator collar encircling the shaft, one end of each of the pins engaging the actuator collar, the other end of each of the pins engaging the outer race of the second anti-friction bearing, and lever means for moving the actuator collar axially upon the shaft, said lever means also being adapted to retain the collar in the axially moved position, axial movement of the actuator collar causing axial movement of the pins, the pins forcing movement of the engagement wheel from the support structure, such axial movement of the collar being against the force of the spring members, movement of the engagement wheel from the support structure causing engagement of the engagement wheel with the clutch plate, engagement of the engagement wheel with the clutch plate thus resulting in rotation of the shaft with rotation of the drive wheel.

3. In a clutch and brake mechanism comprising a support structure provided with a cylindrical bore therein, a bearing firmly positioned within said bore, a shaft rotatably supported within said bearing, a drive wheel rotatably supported upon said shaft in spaced relation from said support structure, a clutch plate supported by the drive wheel concentric therewith, the clutch plate being resiliently retained in spaced relation from the drive wheel, an engagement wheel slidably attached to the shaft intermediate the clutch plate and the support structure, resilient means urging the engagement wheel to abuttingly engage the support structure, pin means carried by said support structure parallel to said shaft and having axial movement with respect to said shaft, an anti-friction bearing having an outer race and an inner race carried by the engagement wheel and encircling the shaft and axially movable with respect to the shaft, the pin members each having one end thereof in engagement with the outer race of the anti-friction bearing, an actuator collar in engagement with the other end of the pin members, and lever means engageable with the actuator collar for movement of the pin members for thus moving the engagement wheel toward the clutch plate, said lever means being operable against the force of the resilient means to move and retain the engagement wheel in engagement with the clutch plate.

4. In a clutch and brake mechanism comprising a support wall provided with a cylindrical bore therein, an anti-friction support bearing within said bore, the anti-friction bearing having an outer race snugly and firmly fitting within said bore, the anti-friction support bearing also being provided with an inner race, a shaft secured to the inner race normal to the support wall and extending on both sides thereof, a drive wheel rotatably mounted upon the shaft on one side of a support wall and in spaced relation therefrom, the drive wheel being provided with a clutch surface facing the support wall, an engagement wheel slidably attached to the shaft intermediate the drive wheel and the support wall, the engagement wheel having a surface engageable with the clutch surface and a surface engageable with the support wall, a spring member disposed between the drive wheel and the engagement wheel urging the engagement wheel toward the support wall, a second anti-friction bearing, the second anti-friction bearing having an inner race supported by the engagement wheel, the second anti-friction bearing being disposed adjacent the first anti-friction bearing, the second anti-friction bearing having an outer race freely rotatable, an aperture axially extending through the outer race of the first anti-friction bearing, a pin member movable in an axial direction through the aperture in the outer race of the first anti-friction support bearing, the pin member being parallel to the shaft and in spaced relation therefrom, and an actuator collar encircling the shaft on the opposite side of the support wall from the drive wheel, one end of the pin member being in engagement with the outer race of the second anti-friction bearing, the other end of the pin member engaging the actuator collar, and lever means engaging the actuator collar for axial movement of the pin member, the pin member thus causing axial movement of the second anti-friction bearing thus resulting in movement of the engagement wheel, the lever means being operable against the force of the spring member to move and retain the engagement wheel in engagement with the clutch wheel.

5. A clutching mechanism for a rotatable shaft comprising a drive wheel rotatably supported upon the shaft, the drive wheel having a clutch surface, a stationary brake plate encircling the shaft and having a brake surface facing the drive wheel and spaced therefrom, an engagement disc nonrotatably carried upon the shaft and axially movable thereupon, the engagement disc being disposed intermediate the brake plate and the drive wheel, bearing means attached to the engagement disc, the bearing means having a portion thereof rotatable with the engagement disc, the bearing means also having a section thereof rotatable with respect to the engagement disc, the engagement disc being axially movable into engagement with the clutch surface of the drive wheel for rotation of the shaft with the drive wheel, the engagement disc also being axially movable into engagement with the brake surface of the brake plate for retaining the shaft against rotation with the drive wheel, and means contacting said section of the bearing means for axial movement of the engagement disc.

References Cited in the file of this patent

UNITED STATES PATENTS

| | | |
|---|---|---|
| 2,269,788 | Schenk | Jan. 13, 1942 |
| 2,313,187 | Williamson | Mar. 9, 1943 |
| 2,440,304 | Simmons | Apr. 27, 1948 |
| 2,757,766 | McCroskey et al. | Aug. 7, 1956 |